(12) United States Patent
Chan

(10) Patent No.: US 10,806,006 B2
(45) Date of Patent: *Oct. 13, 2020

(54) VOLTAGE COMPENSATION DRIVING CIRCUIT

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,931

(22) Filed: Jan. 15, 2020

(65) Prior Publication Data

US 2020/0260551 A1    Aug. 13, 2020

Related U.S. Application Data

(63) Continuation of application No. 16/517,698, filed on Jul. 22, 2019, now Pat. No. 10,575,378.

(30) Foreign Application Priority Data

Feb. 13, 2019   (TW) .............................. 108104863 A

(51) Int. Cl.
*H05B 45/37* (2020.01)
*H02M 3/335* (2006.01)
*H05B 45/00* (2020.01)
*H05B 45/10* (2020.01)
*H05B 45/44* (2020.01)

(52) U.S. Cl.
CPC ........ *H05B 45/37* (2020.01); *H02M 3/33523* (2013.01); *H05B 45/10* (2020.01); *H05B 45/44* (2020.01); *H05B 45/60* (2020.01)

(58) Field of Classification Search
CPC ........ H05B 45/10; H05B 45/37; H05B 45/44; H05B 45/60; H05B 45/382; H05B 45/34; H05B 45/38; H05B 45/385; H02M 3/156; H02M 3/33523; H02M 5/12; H02M 2001/0083; H02M 3/33561; H02M 3/33507; H02M 2001/0025; Y02B 20/347
See application file for complete search history.

(56) References Cited

U.S. PATENT DOCUMENTS

| | | | |
|---|---|---|---|
| 5,055,746 A * | 10/1991 | Hu | H02J 13/00009 315/291 |
| 8,278,830 B2 * | 10/2012 | Archibald | H05B 45/46 315/209 R |
| 8,283,904 B2 * | 10/2012 | Myers | H02M 3/335 323/267 |
| 8,400,072 B2 * | 3/2013 | Huang | H05B 45/37 315/254 |

(Continued)

*Primary Examiner* — Haissa Philogene
(74) *Attorney, Agent, or Firm* — JCIPRNET

(57) ABSTRACT

A voltage compensation driving circuit is provided. The voltage compensation driving circuit converts input power into output power and auxiliary power. The voltage compensation driving circuit provides a boost control signal according to an output current of the output power, and the boost control signal has a duty cycle corresponding to the output current. The voltage compensation driving circuit boosts the auxiliary power by the boost control signal to generate a compensation voltage and transmits the compensation voltage to a light emitting device string via a boost resistor, so as to linearly control a brightness of the light emitting device string.

11 Claims, 2 Drawing Sheets

(56) References Cited

U.S. PATENT DOCUMENTS

| | | | | |
|---|---|---|---|---|
| 8,471,483 B2* | 6/2013 | Lee | ................ | H05B 45/37 |
| | | | | 315/192 |
| 8,853,958 B2* | 10/2014 | Athalye | ................ | H05B 45/35 |
| | | | | 315/283 |
| 8,907,581 B2* | 12/2014 | Ivankovic | ................ | H05B 45/37 |
| | | | | 315/210 |
| 8,907,592 B2* | 12/2014 | Hu | ................ | H05B 45/37 |
| | | | | 315/308 |
| 8,975,825 B2* | 3/2015 | Hu | ................ | H05B 45/39 |
| | | | | 315/239 |
| 9,001,482 B2* | 4/2015 | Chen | ................ | H05B 47/10 |
| | | | | 361/86 |
| 9,030,122 B2* | 5/2015 | Yan | ................ | H05B 45/14 |
| | | | | 315/291 |
| 9,295,117 B2* | 3/2016 | Acatrinei | ................ | H05B 45/382 |
| 9,413,252 B2* | 8/2016 | Xu | ................ | H02M 3/33523 |
| 9,660,539 B2* | 5/2017 | Ren | ................ | H02M 3/33507 |
| 9,974,124 B2* | 5/2018 | Lee | ................ | H05B 45/10 |
| 10,178,731 B2* | 1/2019 | Patton | ................ | H05B 45/38 |
| 10,575,378 B1* | 2/2020 | Chan | ................ | H02M 3/33523 |
| 2012/0224397 A1* | 9/2012 | Yeh | ................ | H02M 3/33507 |
| | | | | 363/21.12 |

\* cited by examiner

VOLTAGE COMPENSATION DRIVING CIRCUIT

CROSS-REFERENCE TO RELATED APPLICATION

This is a continuation application of and claims the priority benefit of U.S. application Ser. No. 16/517,698, filed on Jul. 22, 2019, which claims the priority benefit of Taiwan application serial no. 108104863, filed on Feb. 13, 2019. The entirety of each of the above-mentioned patent applications is hereby incorporated by reference herein and made a part of this specification.

TECHNICAL FIELD

The disclosure relates to a driving device; more particularly, the disclosure relates to a display voltage compensation driving circuit.

DESCRIPTION OF RELATED ART

Existing light emitting device products, such as light emitting diode (LED) products, are mostly required to be capable of performing a dimming function to adjust the brightness of the light emitting devices of the light emitting device products. Generally, the adjustment of the brightness of the light emitting device products may be an increase or decrease in the current of the light emitting devices.

Since the input power is fixed, the increase in the current of the light emitting devices affects an output voltage of a driving circuit of the light emitting device products. For instance, the current of the light emitting devices is increased, and the magnitude of the voltage drop of the output voltage is also increased, which indicates that the voltage for driving the light emitting devices is lowered. Therefore, the increase in the brightness of the light emitting device products cannot keep up with the increase in the current, whereby the light emitting devices cannot linearly adjust the brightness completely according to the adjustment of the current.

SUMMARY

The disclosure provides a voltage compensation driving circuit configured to dynamically adjust a compensation voltage according to an output current of output power, whereby a brightness of a light emitting device string can be linearly controlled.

In an embodiment of the disclosure, a voltage compensation driving circuit configured to drive a light emitting device string is provided. The voltage compensation driving circuit includes a power conversion circuit, a processor, a boost circuit, and a boost resistor. The power conversion circuit has a transformer, a primary-side circuit configured to receive input power, and a secondary-side circuit coupled to a light emitting device string, wherein the transformer includes a primary-side winding coupled to the primary-side circuit, a secondary-side winding coupled to the secondary-side circuit, and an auxiliary winding. The transformer is configured to convert input power, so as to generate output power at the secondary-side winding and generate auxiliary power at the auxiliary winding. The processor is coupled to the light emitting device string. The processor is configured to provide the boost control signal according to an output current of the output power. The boost circuit is coupled to the processor and configured to receive the auxiliary power according to the output current and boost the auxiliary power according to the boost control signal boost, so as to generate a compensation voltage. The boost resistor is coupled between the boost circuit and the high-voltage terminal of the secondary-side circuit and configured to transmit the compensation voltage to the light emitting device string.

In view of the above, the voltage compensation driving circuit described in one or more embodiments of the disclosure provides the boost control signal according to the output current, boosts the auxiliary power according to the boost control signal to generate the compensation voltage, and transmits the compensation voltage to the light emitting device string via the boost resistor. Thereby, the voltage compensation driving circuit can dynamically adjust the compensation voltage according to the output current of the output power and compensate an output voltage by the compensation voltage, so as to linearly control the brightness of the light emitting device string.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
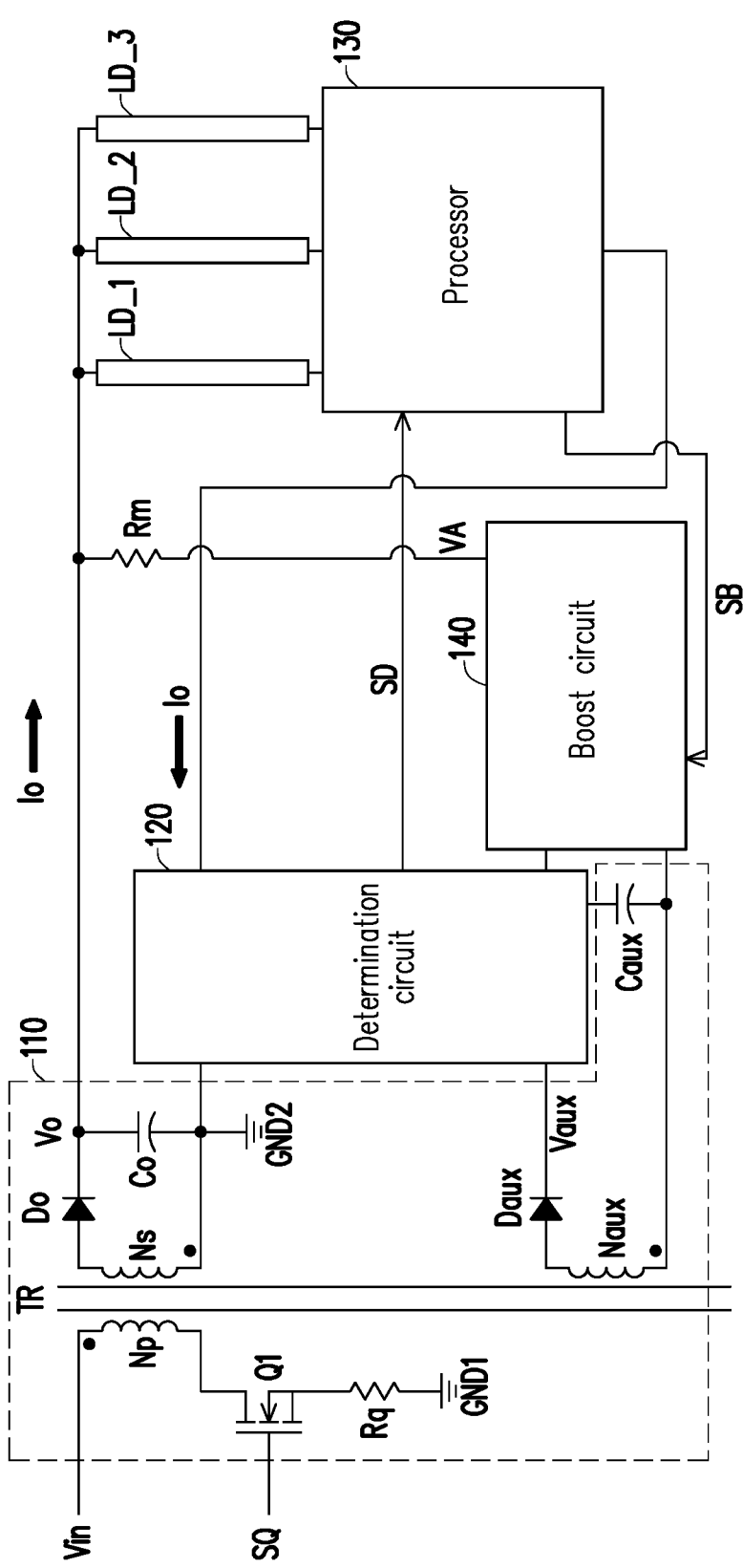
FIG. 1 is a schematic circuitry diagram illustrating a voltage compensation driving circuit according to a first embodiment of the disclosure.

Please refer to FIG. 1, which is a schematic circuitry diagram illustrating a voltage compensation driving circuit according to a first embodiment of the disclosure. In the present embodiment, the voltage compensation driving circuit 100 is configured to drive light emitting device strings LD_1, LD_2, and LD_3. The light emitting device strings LD_1, LD_2, and LD_3 are connected in parallel. The light emitting device strings LD_1, LD_2, and LD_3 can respectively have one single light emitting device or at least one light emitting device connected in series. The light emitting device is, for instance, a light emitting diode (LED), a micro light emitting diode (micro LED), or an organic light emitting diode (OLED). For better illustration, the number of the light emitting device strings is three sets according to the present embodiment, and the number of the light emitting device strings provided in the disclosure may be one or plural, which should not be construed as a limitation in the disclosure. The voltage compensation driving circuit 100 includes a power conversion circuit 110, a determination circuit 120, a processor 130, a boost circuit 140, and a boost resistor Rm.

The power converter includes a transformer TR, a primary-side circuit, and a secondary-side circuit. The transformer TR includes a primary-side winding coupled to the primary-side circuit Np, a secondary-side winding coupled to the secondary-side circuit Ns, and an auxiliary winding Naux. The transformer TR receives input power Vin through the primary-side winding Np (e.g., a common-polarity terminal of the primary-side winding Np, i.e., a dotted terminal) and converts the input power Vin to generate output power Vo at the secondary-side winding Ns and generate auxiliary power Vaux at the auxiliary winding Naux. The primary-side circuit provided in the present embodiment at least includes a main power switch Q1 and a resistor Rq, which should however not be construed as a limitation in the disclosure. A first terminal of the main power switch Q1 is coupled to the transformer TR. A control terminal of the main power switch Q1 is configured to receive a switch signal SQ to perform a switching operation of the main power switch Q1. The resistor Rq is coupled between a second terminal of the main power switch Q1 and a ground germinal GND1 of the primary-side circuit. In the present embodiment, the secondary-side circuit is coupled to the light emitting device strings LD_1, LD_2, and LD_3. The secondary-side circuit at least includes an output diode Do, an output capacitor Co, an auxiliary diode Daux, and an auxiliary capacitor Caux, which should however not be construed as a limitation in the disclosure. An anode of the output diode Do is coupled to a first terminal (e.g., an opposite-polarity terminal of the secondary-side winding Ns, i.e., a non-dotted terminal) of the secondary-side winding Ns. A cathode of the output diode Do is coupled to a first terminal of the output capacitor Co, and a cathode of the output diode Do is configured to output the output power Vo coming from the secondary-side winding Ns and serves as a high-voltage terminal of the secondary-side circuit. A first terminal of the output capacitor Co is coupled to a second terminal (e.g., a common-polarity terminal of the secondary-side winding Ns, i.e., a dotted terminal) of the secondary-side winding Ns and a ground terminal GND2 of the secondary-side circuit. An anode of the auxiliary diode Daux is coupled to a first terminal (e.g., an opposite-polarity terminal of the auxiliary winding Naux, i.e., a non-dotted terminal) of the auxiliary winding Naux. A cathode of the auxiliary diode Daux is coupled to the determination circuit 120. The cathode of the auxiliary diode Daux is configured to output the auxiliary power Vaux. A first terminal of the auxiliary capacitor Caux is coupled to the determination circuit 120. A second terminal of the auxiliary capacitor Caux is coupled to a second terminal (e.g., a common-polarity terminal of the auxiliary winding Naux, i.e., a dotted terminal) of the auxiliary winding Naux.

In the present embodiment, the determination circuit 120 is coupled to the auxiliary winding Naux. The determination circuit 120 is configured to receive the output power Vo provided by the power conversion circuit 110 and transmit the auxiliary power Vaux coming from the auxiliary winding Naux according to the output current Io of the output power Vo. The processor 130 is coupled to the light emitting device strings LD_1, LD_2, and LD_3 and the determination circuit 120. The processor 130 is configured to adjust a brightness of the light emitting device strings LD_1, LD_2, and LD_3. For instance, the processor 130 can linearly regulate the current flowing through the light emitting device strings LD_1, LD_2, and LD_3, respectively and can also evenly distribute the output current Io to the light emitting device strings LD_1, LD_2, and LD_3. Besides, the processor 130 can also provide the boost control signal SB according to the output current Io. The boost control signal SB has a duty cycle corresponding to the output current Io. The boost circuit 140 is coupled to the determination circuit 120 and the processor 130. The boost circuit 140 is configured to boost the auxiliary power Vaux according to the boost control signal SB, so as to generate a compensation voltage VA. That is, the boost circuit 140 may generate the compensation voltage VA according to the auxiliary power Vaux and the duty cycle. The compensation voltage VA and the duty cycle are positively correlated. The boost resistor Rm is coupled between the boost circuit 140 and a high-voltage terminal of the secondary-side circuit. The boost resistor Rm is configured to transmit the compensation voltage VA to the light emitting device strings LD_1, LD_2, and LD_3 and accordingly drive the light emitting device strings LD_1, LD_2, and LD_3.

Specifically, the determination circuit 120 receives the output current Io and determines a voltage level of the determination signal SD according to the output current Io. When the determination circuit 120 determines that the output current Io is adjusted to be greater than a predetermined value, the determination signal SD at a high voltage level is provided. The determination circuit 120 transmits the auxiliary power Vaux to the boost circuit 140 according to the determination signal SD at the high voltage level. In another aspect, when the determination circuit 120 determines that the output current Io is adjusted to be less than or equal to the predetermined value, the determination signal SD at a low voltage level is provided. The determination circuit 120 does not transmit any auxiliary power Vaux according to the determination signal SD at the low voltage level. The determination circuit 120 further provides the determination signal SD to the processor 130.

The processor 130 can receive the determination signal SD from the determination circuit 120. The processor 130 provides the boost control signal SB according to the voltage level of the determination signal SD. In the present embodiment, the processor 130 provides the boost control signal SB according to the determination signal SD at a high voltage level and does not provide any boost control signal SB according to the determination signal SD at a low voltage level. That is, when the output current Io is adjusted to be greater than the predetermined value, the determination circuit 120 transmits the auxiliary power Vaux to the boost circuit 140, and the processor 130 also provides the boost control signal SB to drive the boost circuit 140. The compensation voltage VA and the duty cycle are positively correlated. The processor 130 also adjusts the duty cycle of the boost control signal SB according to a variation in the output current Io. That is, boost control signal SB has the duty cycle corresponding to the output current Io. Therefore, when the boost circuit 140 receives the boost control signal SB, the boost circuit 140 boosts the auxiliary power Vaux according to the duty cycle of the boost control signal SB, so as to generate the compensation voltage VA. The boost resistor Rm receives the compensation voltage VA generated by the boost circuit 140 and transmits the compensation voltage VA to the high-voltage terminal of the secondary-side circuit, so as to transmit the compensation voltage VA to the light emitting device strings LD_1, LD_2, and LD_3.

From another perspective, when the output current Io is adjusted to be less than the predetermined value, the determination circuit 120 does not transmit any auxiliary power Vaux to the boost circuit 140, nor the processor 130 provides any boost control signal SB. Hence, the boost circuit 140 does not generate the compensation voltage VA, and the light emitting device strings LD_1, LD_2, and LD_3 are driven by the output power Vo generated by the secondary-side winding Ns.

It should be mentioned that the voltage compensation driving circuit 100 provides the boost control signal SB according to the output current Io, boosts the auxiliary power Vaux according to the boost control signal SB to generate the compensation voltage VA, and transmits the compensation voltage VA to the light emitting device strings LD_1, LD_2, and LD_3 through the boost resistor Rm. Thereby, the voltage compensation driving circuit 100 can dynamically adjust the compensation voltage VA according to the output current Io of the output power Vo and compensate an output voltage by the compensation voltage VA, so as to linearly control the brightness of the light emitting device strings LD_1, LD_2, and LD_3.

Figure 2:
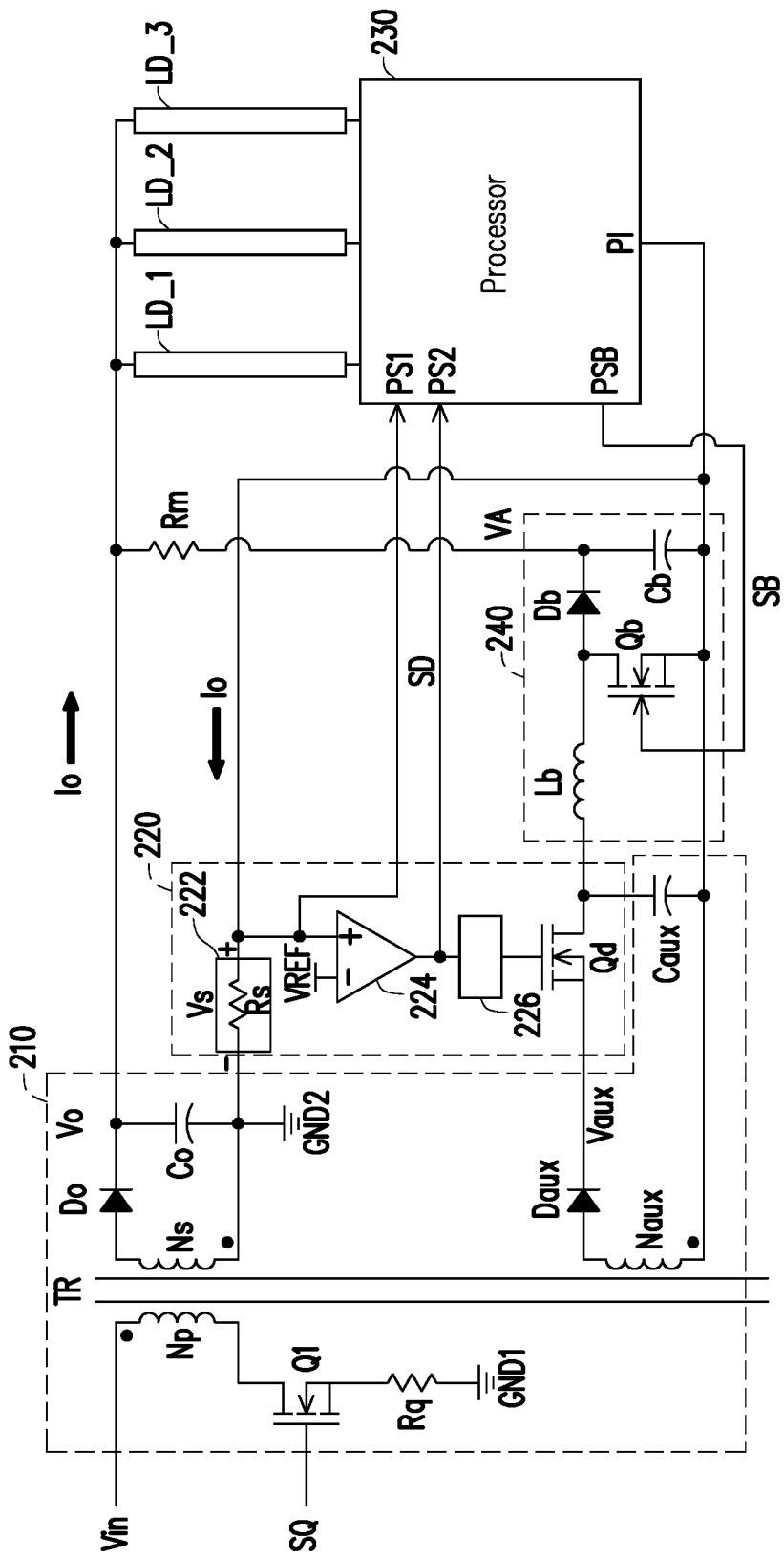
FIG. 2 is a schematic circuitry diagram illustrating a voltage compensation driving circuit according to a second embodiment of the disclosure.

Please refer to FIG. 2, which a schematic circuitry diagram illustrating a voltage compensation driving circuit according to a second embodiment of the disclosure. In the present embodiment, the voltage compensation driving circuit 200 includes a power conversion circuit 210, a determination circuit 220, a processor 230, a boost circuit 240, and a boost resistor Rm. The coupling relationship among the power conversion circuit 210, the determination circuit 220, the processor 230, the boost circuit 240, and the boost resistor Rm is sufficiently taught in the first embodiment and thus will not be further explained. In the present embodiment, the determination circuit 220 includes a sensing circuit 222, a comparator 224, and an auxiliary switch Qd. The implementation details of the power conversion circuit 210 are sufficiently taught by the power conversion circuit 110 provided in the first embodiment, and therefore no other explanations are given hereinafter. The sensing circuit 222 is configured to receive the output current Io of the output power Vo through the light emitting device strings LD_1, LD_2, and LD_3 and the processor 230 and generate a sensing voltage Vs according to the output current Io. The sensing circuit 222 can at least include a sensing resistor Rs. A first terminal of the sensing resistor Rs is coupled to the processor 230 to receive the output current Io. A second terminal of the sensing resistor Rs is coupled to the ground terminal GND2 of the secondary-side circuit.

Note that a resistance of the boost resistor Rm is designed to be significantly greater than a resistance of the sensing resistor Rs. The resistance of the boost resistor Rm is designed to be equal to or greater than 10 times the resistance of the sensing resistor Rs. For instance, the resistance of the boost resistor Rm is 10 MΩ, while the resistance of the sensing resistor Rs is 1Ω. Such design ensures that the output power Vo can effectively drive the light emitting device strings LD_1, LD_2, and LD_3 and prevent the output power Vo from entering the boost circuit 240 through the boost resistor Rm.

A non-inverting input terminal of the comparator 224 is coupled to the sensing circuit 222. The non-inverting input terminal of the comparator 224 is configured to receive a reference voltage VREF. The comparator 224 can provide the determination signal SD through the output terminal of the comparator 224 according to a comparison result of the sensing voltage Vs and the reference voltage VREF.

A first terminal of the auxiliary switch Qd is coupled to the first terminal of the auxiliary winding Naux. Namely, the first terminal of the auxiliary switch Qd can receive the auxiliary power Vaux through the auxiliary diode Daux. A second terminal of the auxiliary switch Qd is coupled to the boost circuit 240, and a control terminal of the auxiliary switch Qd is coupled to an output terminal of the comparator 224. A control terminal of the auxiliary switch Qd can be turned on or off according to a voltage level of the sensing voltage Vs.

In some embodiments, the determination circuit 220 may further include a buffer 226. The buffer 226 is coupled between the output terminal of the comparator 224 and the control terminal of the auxiliary switch Qd. The buffer 226 can provide the switch signal to the control terminal of the auxiliary switch Qd according to the voltage level of the determination signal SD. In some embodiments, the buffer 226 can gain the voltage of the determination signal SD to provide the switch signal. Hence, the voltage level of the switch signal is higher than the high voltage level of the determination signal SD. Thereby, the buffer 226 can further ensure the auxiliary switch Qd driven by the switch signal to be completely switched on or off.

The processor 230 includes output pins PI and PSB and input pins PS1 and PS2. The processor 230 can provide the output current Io to the sensing circuit 222 through the output pin PI. The processor 230 can receive the sensing voltage Vs through the input pin PS1, so as to learn the variation in the output current Io. In the present embodiment, the processor 230 can learn the variation in the output current Io according to the sensing voltage Vs and the resistor in the processor 230. The processor 230 can receive the determination signal SD through the input pin PS2 and provide the boost control signal SB through the output pin PSB according to the voltage level of the determination signal SD.

The boost circuit 240 includes a boost inductor Lb, a boost diode Db, a boost capacitor Cb, and a boost power switch Qb. A first terminal of the boost inductor Lb is coupled to the determination circuit 220 to receive the auxiliary power Vaux. A first terminal of the boost inductor Lb is coupled to the auxiliary switch Qd, so as to receive the auxiliary power Vaux through the switched-on auxiliary switch Qd. An anode of the boost diode Db is coupled to a second terminal of the boost inductor Lb. A first terminal of the boost capacitor Cb is coupled to a cathode of the boost diode Db. A second terminal of the boost capacitor Cb is coupled to the auxiliary winding Naux, i.e., the second terminal of the auxiliary winding Naux. A first terminal of the boost power switch Qb is coupled to the second terminal of the boost inductor Lb. A second terminal of the boost power switch Qb is coupled to the second terminal of the boost capacitor Cb. A control terminal of the boost power switch Qb is coupled to the processor 230 to receive the boost control signal SB. A switching frequency of the boost power switch Qb may be the same as a switching frequency of the main power switch Q1; in other words, a frequency of the switch signal SQ and a frequency of the boost control signal SB are the same. In some embodiments, the switching frequency of the boost power switch Qb may be different from the switching frequency of the main power switch Q; in other words, the frequency of the switch signal SQ and the frequency of the boost control signal SB may be different.

Here, for instance, the reference voltage VREF can be set as 1.9 volts. The resistance of the sensing resistor Rs can be set as 1Ω. When the light emitting device strings LD_1, LD_2, and LD_3 has the relatively small brightness, the output current Io is 1.5 amps. The sensing circuit 222 receives the output current Io and accordingly generates the sensing voltage Vs. At this time, the sensing voltage Vs is 1.5 volts. The comparator 224 determines that the sensing voltage Vs (1.5 volts) is lower than the reference voltage VREF (1.9 volts). Therefore, the comparator 224 provides the determination signal SD at a low logic level. The auxiliary switch Qd is switched of according to the determination signal SD at the low logic level. Hence, the auxiliary power Vaux is not transmitted to the boost circuit 240. Additionally, the processor 230 does not provide any boost control signal SB according to the determination signal SD at the low logic level. Hence, the boost circuit 240 is not being operated.

Besides, for instance, when the brightness of the light emitting device strings LD_1, LD_2, and LD_3 is increased, whereby the output current Io is raised to 2 amps, the sensing circuit 222 receives the output current Io and accordingly generates the sensing voltage Vs. At this time, the sensing voltage Vs is 2 volts. The comparator 224 determines that the sensing voltage Vs (2 volts) is greater than the reference voltage VREF (1.9 volts). Hence, the comparator 224 provides the determination signal SD at a high logic level. The auxiliary switch Qd is switched on according to the determination signal SD at the high logic level. Therefore, the auxiliary power Vaux can be transmitted to the boost circuit 240. Besides, the processor 230 provides the boost control signal SB according to the determination signal SD at the high logic level and adjusts the duty cycle of the boost control signal SB according to the variation in the output current Io. If the processor 230 determines that the output current Io is continuously increased, the processor 230 increases the duty cycle of the boost control signal SB. The boost circuit 240 raises the compensation voltage VA according to the duty cycle of the boost control signal SB. If the processor 230 determines that the output current Io is reduced, the processor 230 reduces the duty cycle of the boost control signal SB. The boost circuit 240 lowers the compensation voltage VA according to the duty cycle of the boost control signal SB. In the present embodiment, the duty cycle can be adjusted to 0.3-0.8, which should not be construed as a limitation in the disclosure.

It should be mentioned that the voltage compensation driving circuit 200 can dynamically adjust the compensation voltage VA according to the variation in the output current Io, so that the voltage of the voltage compensation driving circuit 200 is not reduced because of the increase in the output current Io. Thereby, the voltage compensation driving circuit 200 can linearly control the brightness of the light emitting device strings LD_1, LD_2, and LD_3.

To sum up, the voltage compensation driving circuit described in one or more embodiments of the disclosure may provide the boost control signal according to the output current, boost the auxiliary power according to the boost control signal to generate the compensation voltage, and transmit the compensation voltage to the light emitting device string via the boost resistor. Thereby, the voltage compensation driving circuit can dynamically adjust the compensation voltage according to the output current and compensate an output voltage by the compensation voltage, so as to linearly control the brightness of the light emitting device string. As such, the linear control of the brightness of the light emitting device string through the adjustment of the output current can be achieved.

It will be apparent to those skilled in the art that various modifications and variations can be made to the structure provided in the disclosure without departing from the scope or spirit indicated herein. In view of the foregoing, it is intended that the disclosure cover modifications and variations provided they fall within the scope of the following claims and their equivalents.

What is claimed is:

1. A voltage compensation driving circuit configured to drive at least one light emitting device string, the voltage compensation driving circuit comprising:
   a power conversion circuit having a transformer, a primary-side circuit configured to receive input power, and a secondary-side circuit coupled to the at least one light emitting device string, wherein the transformer comprises a primary-side winding coupled to the primary-side circuit, a secondary-side winding coupled to the secondary-side circuit, and an auxiliary winding, wherein the transformer is configured to convert the input power, so as to generate output power at the secondary-side winding and generate auxiliary power at the auxiliary winding;
   a processor coupled to the at least one light emitting device string, configured to provide a boost control signal according to an output current of the output power;
   a boost circuit coupled to the processor and configured to receive the auxiliary power according to the output current and boost the auxiliary power according to the boost control signal, so as to generate a compensation voltage; and
   a boost resistor coupled between the boost circuit and a high-voltage terminal of the secondary-side circuit and configured to transmit the compensation voltage to the at least one light emitting device string.

2. The voltage compensation driving circuit according to claim 1, further comprising:
   a determination circuit coupled to the auxiliary winding and the processor, and configured to transmit the auxiliary power according to the output current of the output power.

3. The voltage compensation driving circuit according to claim 2, wherein the determination circuit comprises:
   a sensing circuit configured to receive the output current through the at least one light emitting device string and the processor and generate a sensing voltage according to the output current;
   a comparator, a non-inverting input terminal of the comparator being coupled to the sensing circuit, an inverting input terminal of the comparator being configured to receive a reference voltage, wherein the comparator provides a determination signal through an output terminal of the comparator according to a comparison result of the sensing voltage and the reference voltage; and
   an auxiliary switch, a first terminal of the auxiliary switch being coupled to a first terminal of the auxiliary winding, a second terminal of the auxiliary switch being coupled to the boost circuit, a control terminal of the auxiliary switch being coupled to the output terminal of the comparator.

4. The voltage compensation driving circuit according to claim 3, wherein when the sensing voltage is greater than the reference voltage, the determination circuit switches on the auxiliary switch, so as to provide the auxiliary power to the boost circuit.

5. The voltage compensation driving circuit according to claim 3, wherein the processor is further configured to receive the determination signal, provide the boost control signal according to a voltage level of the determination signal, and adjust a duty cycle of the boost control signal according to a variation in the output current.

6. The voltage compensation driving circuit according to claim 5, wherein the compensation voltage and the duty cycle are positively correlated.

7. The voltage compensation driving circuit according to claim 5, wherein when the voltage level of the determination signal is a high voltage level, the processor provides the boost control signal and increase the duty cycle of the boost control signal according to the increased output current.

8. The voltage compensation driving circuit according to claim 3, wherein the sensing circuit comprises:
   a sensing resistor, a first terminal of the sensing resistor being coupled to the processor to receive the output current, a second terminal of the sensing resistor being coupled to a ground terminal of the secondary-side circuit.

9. The voltage compensation driving circuit according to claim 8, wherein a resistance of the boost resistor is greater than a resistance of the sensing resistor.

10. The voltage compensation driving circuit according to claim 3, wherein the determination circuit further comprises:
    a buffer coupled between the output terminal of the comparator and the control terminal of the auxiliary switch and configured to provide a switch signal to the control terminal of the auxiliary switch according to a voltage level of the determination signal.

11. The voltage compensation driving circuit according to claim 2, wherein the boost circuit comprises:
    a boost inductor, a first terminal of the boost inductor being coupled to the determination circuit to receive the auxiliary power;
    a boost diode, an anode of the boost diode being coupled to a second terminal of the boost inductor;
    a boost capacitor, a first terminal of the boost capacitor being coupled to a cathode of the boost diode, a second terminal of the boost capacitor being coupled to the auxiliary winding; and
    a boost power switch, a first terminal of the boost power switch being coupled to the second terminal of the boost inductor, a second terminal of the boost power switch being coupled to the second terminal of the boost capacitor, a control terminal of the boost power switch being coupled to the processor to receive the boost control signal.

* * * * *